(12) United States Patent
Elman et al.

(10) Patent No.: US 6,937,310 B2
(45) Date of Patent: Aug. 30, 2005

(54) COMPENSATION FILMS FOR LCDS

(75) Inventors: James F. Elman, Fairport, NY (US);
Tomohiro Ishikawa, Rochester, NY (US); Dennis J. Massa, Pittsford, NY (US); Paul D. Yacobucci, Rochester, NY (US); Catherine A. Falkner, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 48 days.

(21) Appl. No.: 10/439,541

(22) Filed: May 16, 2003

(65) Prior Publication Data

US 2004/0227879 A1 Nov. 18, 2004

(51) Int. Cl.[7] .................. G02F 1/1335; C09K 19/02
(52) U.S. Cl. .................. 349/118; 349/117; 349/119; 349/181; 252/299.01; 428/1.3
(58) Field of Search .............. 349/117–119, 181; 428/1.3; 252/299.01

(56) References Cited

U.S. PATENT DOCUMENTS

| | | | | |
|---|---|---|---|---|
| 4,713,268 A | * | 12/1987 | Carson ................. | 428/36.8 |
| 5,225,285 A | * | 7/1993 | Hall et al. ............. | 428/413 |
| 5,480,964 A | | 1/1996 | Harris et al. | |
| 5,580,950 A | | 12/1996 | Harris et al. | |
| 5,583,679 A | * | 12/1996 | Ito et al. .............. | 349/118 |
| 5,885,704 A | * | 3/1999 | Peiffer et al. .......... | 428/315.9 |
| 6,074,709 A | * | 6/2000 | Ezzell et al. ........... | 428/1.3 |
| 6,139,771 A | * | 10/2000 | Walba et al. ........... | 252/299.01 |
| 2003/0219549 A1 | | 11/2003 | Shimizu ................ | 428/1 |

FOREIGN PATENT DOCUMENTS

| | | |
|---|---|---|
| EP | 0 544 013 | 6/1993 |
| EP | 1 197 768 | 4/2002 |

OTHER PUBLICATIONS

Fuming Li, et al, "Polyimide Films as Negative Birefringent Compensators for Normally White Twisted Nematic Liquid Crystal Displays", POLYMER, vol. 37, No. 23, 1996, pp 5321–5325.

J.F. Elman et al, "Multilayer Optical Compensator, Liquid Crystal Display, and Process", USSN 10/ , (D–84083US2) filed May 8, 2003, a Continuation–in–Part of 10/211,401 filed Aug. 2, 2002.

* cited by examiner

*Primary Examiner*—Huyen Ngo
(74) *Attorney, Agent, or Firm*—Arthur E. Kluegel

(57) ABSTRACT

Disclosed is an optical compensation film for Liquid Crystal Displays comprising an amorphous polymer layer disposed on a substrate wherein said amorphous polymer layer has an out-of-plane birefringence $\Delta n_{th}(\lambda)$ at a wavelength $\lambda$ that satisfies both conditions (1) and (2):

Condition (1) $\Delta n_{th}(\lambda)$ is more negative than $-0.005$ throughout the range of 370 nm$<\lambda<$700 nm;

Condition (2) $\Delta n_{th}(\lambda_1)$ is more negative than $\Delta n_{th}(\lambda_2)$, for $\lambda_1<\lambda_2$ throughout the range of 370 nm$<\lambda<$700 nm.

34 Claims, 9 Drawing Sheets

COMPENSATION FILMS FOR LCDS

FIELD OF THE INVENTION

The present invention relates to an optically transparent compensation film for liquid crystal displays (LCD) comprising an amorphous polymer layer with negative out-of-plane birefringence exhibiting proper dispersion. The invention also provides a process for making such a compensation film.

BACKGROUND OF THE INVENTION

The following terms have the definitions as stated below.

Optic axis herein refers to the direction in which propagating light does not see birefringence.

A-plate and C-plate herein are the plates in which the optic axis is in the plane of the plate and perpendicular to the plate.

Polarizer herein refers to elements that polarize an electromagnetic wave.

In-plane phase retardation, $R_{in}$, of a film 201 shown in FIG. 1 is a quantity defined by $(nx-ny)d$, where nx and ny are indices of refraction in the direction of x and y, respectively and x-y plane is parallel to the plane 203 of the film d is a thickness of the film in z-direction. The quantity $(nx-ny)$ is referred as in-plane birefringence. Both of these in-plane quantities will be treated as absolute values with no preferred sign convention.

Out of-plane phase retardation, $R_{th}$, of a film 201 shown in FIG. 1, herein, is a quantity defined by $[nz-(nx+ny)/2]d$. nz is the index of refraction in z-direction. The quantity $[nz-(nx+ny)/2]$ is referred as out-of-plane birefringence, $\Delta n_{th}$. If $nz>(nx+ny)/2$, $\Delta n_{th}$ is positive, thus the corresponding $R_{th}$ is also positive. If $nz<(nx+ny)/2$, $\Delta n_{th}$ is negative and $R_{th}$ is also negative.

Amorphous herein means a lack of long-range order. Thus an amorphous polymer does not show long-range order as measured by techniques such as X-ray diffraction.

Liquid crystals are widely used for electronic displays. In these display systems, a liquid crystal cell is typically situated between a pair of polarizers. An incident light polarized by the polarizer passes through a liquid crystal cell and is affected by the molecular orientation of the liquid crystal, which can be altered by the application of a voltage across the cell. The altered light goes into the second polarizer. By employing this principle, the transmission of light from an external source, including ambient light, can be controlled. The energy required to achieve this control is generally much less than required for the luminescent materials used in other display types such as cathode ray tubes (CRT). Accordingly, LCD technology is used for a number of electronic imaging devices, including but not limited to digital watches, calculators, portable computers, electronic games, and televisions for which light-weight, low-power consumption and long-operating life are important features.

Contrast, color reproduction, and stable gray scale intensities are desirable attributes for electronic displays, which employ LCD technology. The primary factor limiting the contrast of a LCD is the propensity of the light to "leak" through liquid crystal elements or cells, which are in the dark or "black" pixel state. Furthermore, this leakage and hence the contrast of a liquid crystal display are also dependent on the direction from which the display is viewed. Typically the optimum contrast is observed only within a narrow viewing angle range centered about the normal incidence to the display and falls off rapidly as viewing direction moves away from the display normal. In color LCDs, this leakage problem not only degrades the contrast but also causes color or hue shifts with an associated degradation of color reproduction. There are various modes of LCDs. Twisted Nematic (TN) LCDs are liquid crystal displays in which optic axis of liquid crystal rotates 90° in the azimuthal angle across the liquid crystal cell thickness direction when no field is applied. With a sufficiently large applied field, the liquid crystal optic axis becomes perpendicular to the liquid crystal cell plane except in the vicinity of cell bounding plate. In the vicinity of the cell bounding plate, the liquid crystal optic axis deviates from the cell normal direction. Vertically Aligned (VA) LCDs have liquid crystal optic axis that is substantially perpendicular to the liquid crystal cell plane without an applied field. This state corresponds to a dark state of the displays. With applied field, liquid crystal optic axis tilt away from the cell normal direction. Optically Compensated Bend (OCB) LCDs are liquid crystal displays based on the symmetric bow-shape bend state of liquid crystal optic axis. The bow-shape bend state occurs in the plane perpendicular to the liquid crystal cell plane and the state of bend is symmetric around the mid point in the cell thickness direction. In-plane switching (IPS) LCDs are liquid crystal display in which the field is to change the direction of the liquid crystal optic axis is applied in the plane of the liquid crystal cell. In IPS LCDs, the liquid crystal optic axis changes its direction while remaining substantially in the plane of the liquid crystal cell.

LCDs are quickly replacing CRTs as monitors for desktop computers and other office or household appliances. It is also expected that the number of LCD television monitors with a larger screen size will sharply increase in the near future. However, unless problems of viewing angle dependence such as coloration, degradation in contrast, and an inversion of brightness are solved, the replacement of the traditional CRT by LCDs will be limited.

One of the common methods to improve LCD viewing angle characteristic is to use compensation films. Situated between a polarizer and a liquid crystal cell, a compensation film annuls the phase retardation imposed on the propagating light by the liquid crystal cell. Several LCD modes, with or without an applied field, exhibit positive C-plate symmetry that can be compensated by a compensation film with negative C-plate property. As is well known to those who are skilled in the art, TN and OCB Liquid Crystal Cell show C-plate symmetry in the center portion of the cell with sufficiently high, applied electric field. The VA Liquid Crystal Cell exhibits C-plate symmetry in the state without an applied field. This approximate positive C-plate state of a liquid crystal cell gives a dark state, if it is placed between the crossed polarizers. Here, crossed polarizers mean that transmission (or absorption) axes of two polarizers form an angle of 90±10°. The ray propagating perpendicular to the liquid crystal cell essentially does not see birefringence. That is the reason why in the normal viewing direction one has the highest contrast ratio in some modes of LCDs. On the other hand, obliquely propagating light rays see the phase retardation and this leads to light leakage in the dark state and degrades the contrast ratio. FIG. 2 schematically shows the principle of compensation. Ellipsoid 301 represents the positive C-plate that approximates liquid crystal cell 305 having $nx_{lc}=ny_{lc}=no_{lc}$, $nc_{lc}=ne_{lc}$ where $ne_{lc}>no_{lc}$. $ne_{lc}$ and $no_{lc}$ are extraordinary and ordinary indices of liquid crystal. Compensation film 307 with negative $R_{th}$ is shown by the ellipsoid 309. Here we have $(nx+ny)/2>nz$, thus giving a negative $R_{th}$. For the rays 311 obliquely propagating with an incident angle $\phi$ through the liquid crystal cell 305, the positive phase retardation from liquid crystal cell 305 is canceled by the negative phase retardation of the compensation film 307. Therefore, one can effectively prevent the light leakage caused by the birefringence of the liquid crystal cell in the oblique direction. Thus, compensation film for various modes of LCDs must have a negative $R_{th}$ and simple methods to obtain this negative $R_{th}$ are highly desirable for optical compensation of LCDs.

One of the essential attributes of LCD compensation is the wavelength dependence (or dispersion) of the phase retardation and birefringence versus the wavelength of light ($\lambda$). It is important to achieve a proper dark state without color shift. Phase retardation is directly proportional to the birefringence, and their dispersion shape (proper or reverse) is likewise related. "Proper" dispersion is such that the absolute value of phase retardation and birefringence increases toward shorter $\lambda$ (i.e. towards the ultraviolet region). Conversely, materials with "reverse" dispersion have smaller absolute value of phase retardation and birefringence in the shorter $\lambda$ region. Typical liquid crystal cells use materials with proper dispersion, which show larger positive values of birefringence and phase retardation toward shorter $\lambda$. For the negative birefringence case (the compensation film), proper dispersion gives larger negative value of birefringence and phase retardation at shorter $\lambda$. Conversely, negative birefringence with reverse dispersion (i.e. less desirable compensation films) exhibits less negative birefringence and phase retardation for light with shorter $\lambda$. The phase retardation dispersion of the liquid crystal cell and the compensation film have to be the same kind to properly cancel the phase retardation of a liquid crystal cell by compensation film. That is, if the liquid crystal phase retardation assumes larger positive value at shorter $\lambda$ (i.e. positive birefringence with proper dispersion), the compensation films have to have larger negative value (i.e. negative birefringence with proper dispersion) of $R_{th}$ (or $\Delta n_{th}$) for good compensation.

FIG. 3 explains the concept. The liquid crystal cell in the positive C-plate state has a positive out-of-plane birefringence $\Delta n_{lc} = (n e_{lc} - n o_{lc})$. The phase retardation to be compensated by a compensation film with negative out-of-plane birefringence and phase retardation is $R_{th-lc} = d_{lc} \Delta n_{lc}$ (where $d_{lc}$ is a thickness of a liquid crystal cell). The curves show the wavelength dependence of $R_{th-lc} = d_{lc} \Delta n_{lc}$, 401 and $R_{th} = d\Delta n_{th} = d[nz-(nx+ny)/2]$ of the compensation films, 403, 407. A typical liquid crystal is positively birefringent and has proper birefringence dispersion. Namely, the birefringence $\Delta n_{lc}$ increases toward the shorter wavelength $\lambda$. Therefore, the phase retardation $R_{th-lc}$ assumes a larger positive value at the shorter $\lambda$ as shown by the curve 401. To counterbalance it, the compensation film is required to have also proper phase retardation dispersion shown by the curve 403. Films with the property shown by the curve 403 have a larger negative value of $\Delta n_{th}$ and $R_{th}$ at the shorter $\lambda$. On the other hand, curve 407 shows the compensation film of reverse dispersion. In this case, the birefringence of the film $\Delta n_{th}$ and $R_{th}$ has a smaller negative value at the shorter $\lambda$. Thus, proper cancellation of the phase retardation of a liquid crystal cell (a positive C-plate) cannot be achieved by a film with reverse dispersion for a wide range of wavelengths. Another important aspect of the compensation films is the transparency. At each wavelength $\lambda$, percent transmission of the film T($\lambda$) can be measured. Percent transmission T($\lambda$) gives the intensity percentile of the transmitted light with respect to the incident light in the film normal direction. The average transmission in the wavelength range $\lambda_1 \leq \lambda \leq \lambda_2$ is defined as $T_{av} =$ $$\frac{\int_{\lambda_1}^{\lambda_2} T(\lambda)}{\lambda_2 - \lambda_1}.$$

Optically transparent film is a film such that $T_{av} \geq 90\%$ for $\lambda_1 = 400$ nm and $\lambda_2 = 700$ nm. Such a film is preferred, as it does not compromise the brightness of the image on LCDs. Several means of obtaining negative $R_{th}$ have been suggested. Sergan et al. discusses the crossed A-plate as a replacement of the negative C-plate ("Two Crossed A-plates as an Alternative to a Negative C-plate", Society of Information Display 2000, pp. 838–841). Two A-plates are placed on top of each other with their optic axes forming 90°. They showed that crossed A-plates function approximately as a negative-C plate and successfully compensated the VA Liquid Crystal Cell. This method, however, involves cumbersome process of laminating two films with A-plate property to form one compensation film of negative-C behavior. Further, it is known to those who skilled in the art that crossed A-plates do not show negative C-plate behavior to rays with a small incident angle $\phi$. Thus it is not a desirable method of obtaining negative $R_{th}$.

JP 1999-95208 discloses the use of a swellable inorganic clay layer in a crosslinked organic matrix to generate negative $R_{th}$. The disclosed method enables continuous means of manufacturing films with negative C-plate character. However, the resulting film gives the reverse dispersion, represented by a curve 407. Thus it is not suitable as a compensation film.

Li et al. ("Polyimide film as negative birefringent compensators for normally white twisted nematic liquid crystal displays", Polymer, Volume 37, pp 5321–5325, (1996)) disclosed a polyimide layer formed by spin-casting or dip-emersion method. The film shows proper dispersion. This paper describes several polyimides that could be used as compensation films with negative $R_{th}$. However, the $T_{av}$ is less than 90%. Also, as is well known to those who skilled in the art, polyimides generally suffer from a yellow-orange coloration. Thus, they are not desirable to be used as a compensation film because the color of the film would shift the hue of the images on the LCD's.

The use of a biaxially stretched cellulose ester film as a compensation film is disclosed in JP 2002-236216. Biaxially stretched cellulose ester film with large negative $R_{th}$ and positive $R_{in}$ is used as a substrate on which optically anisotropic layer with O-plate character is disposed. This biaxially stretched cellulose ester film (according to the disclosure) exhibits sufficient negative $R_{th}$ to be useful as a compensation film. However, it possesses a reverse dispersion in $\Delta n_{th}$, and thus in $R_{th}$.

Prior arts offer methods of obtaining films with sufficiently large negative $R_{th}$ value. However, prior art films do not offer films with proper dispersion in negative $R_{th}$ and $\Delta n_{th}$ that can be easily manufactured and have a high $T_{av}(T_{av} \geq 90\%$, that is optically transparent). Also, it is highly desirable to obtain thinner compensation film with large negative $R_{th}$ value. This enables overall LCD packages, comprising liquid crystal cell, compensation films, and polarizers to be slimmer. Thus, a desired method would offer a compensation film with sufficiently large negative $R_{th}$ and the desired, proper retardation/birefringence dispersion, without significant increase in the display thickness.

SUMMARY OF THE INVENTION

The invention provides an optical compensation film for Liquid Crystal Displays that has a negative $R_{th}$ with a proper dispersion. It comprises an amorphous polymer layer disposed on a substrate. The out-of-plane birefringence $\Delta n_{th}(\lambda)$ of the amorphous polymer at a wavelength $\lambda$ satisfies conditions (1) and (2), respectively:

Condition (1)

$\Delta n_{th}(\lambda)$ is more negative than −0.005 throughout the range or 370 nm<$\lambda$<700 nm;

Condition (2)

$\Delta n_{th}(\lambda_1)$ is more negative than $\Delta n_{th}(\lambda_2)$, for $\lambda_1 < \lambda_2$ throughout the range of 370 nm<$\lambda$<700 nm.

Thus, the compensation film comprises a layer with large, negative values of $\Delta n_{th}$. This amorphous polymer layer enables an increase in the negative value of $R_{th}$ of the compensation film, without a significant thickening of the film. The invention also includes a Liquid Crystal Display including the compensation film and a process for forming the compensation film.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that elements not specifically shown or described may take various forms well known to those skilled in the art.

The invention provides an optical compensation film for Liquid Crystal Displays that has a negative $R_{th}$ with a proper dispersion. It comprises an amorphous polymer layer disposed on the substrate. The out-of-plane birefringence $\Delta n_{th}$ ($\lambda$) of the amorphous polymer at a wavelength $\lambda$ that satisfies conditions (1) and (2), respectively:

Condition (1)

$\Delta n_{th}(\lambda)$ is more negative than −0.005 throughout the range of 370 nm<$\lambda$<700 nm;

Condition (2)

$\Delta n_{th}(\lambda_1)$ is more negative than $\Delta n_{th}(\lambda_2)$, for $\lambda_1 < \lambda_2$ throughout the range of 370 nm<$\lambda$<700 nm.

Figure 1:
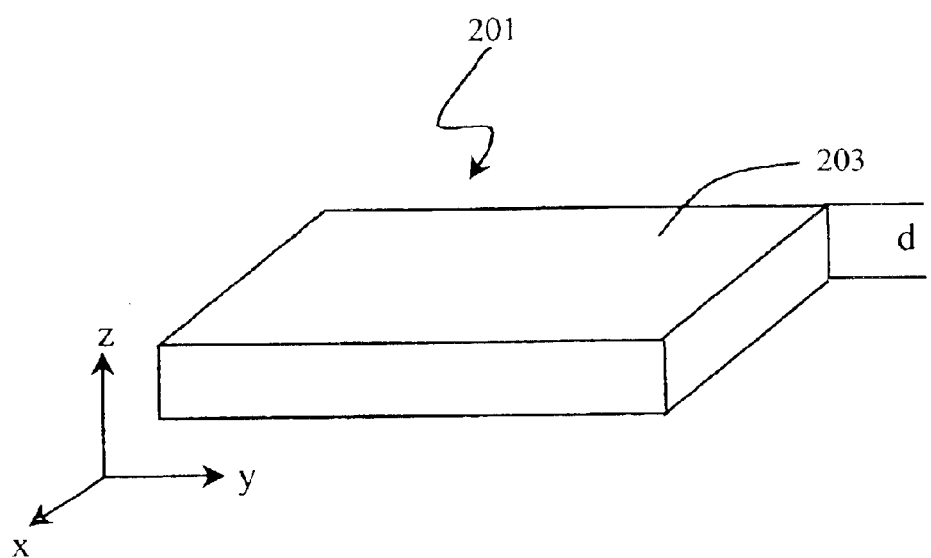
FIG. 1 shows the film with thickness d and x-y-z coordinate system attached to the film.
Figure 2:
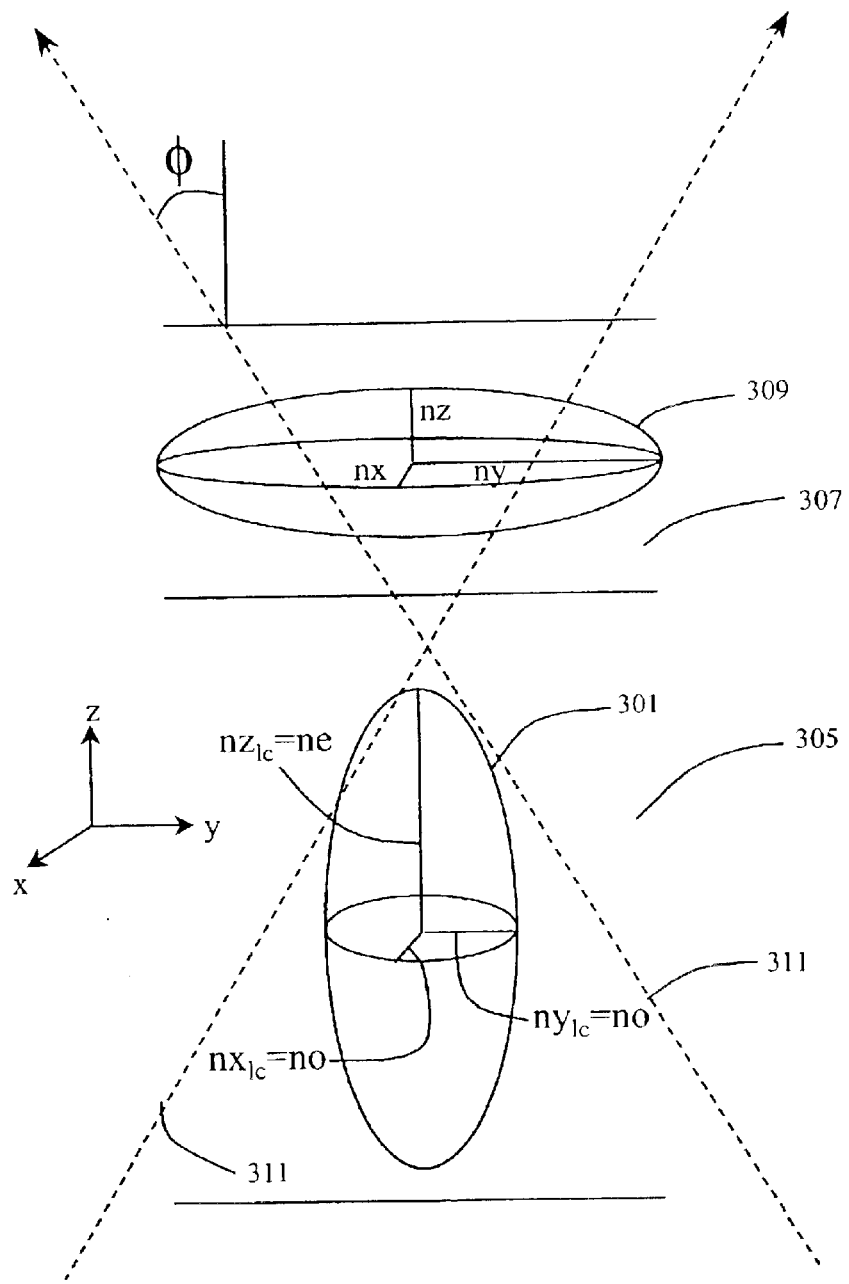
FIG. 2 shows the principle of compensation of a liquid crystal cell with positive C-plate character with a compensation film with negative $R_{th}$.
Figure 3:
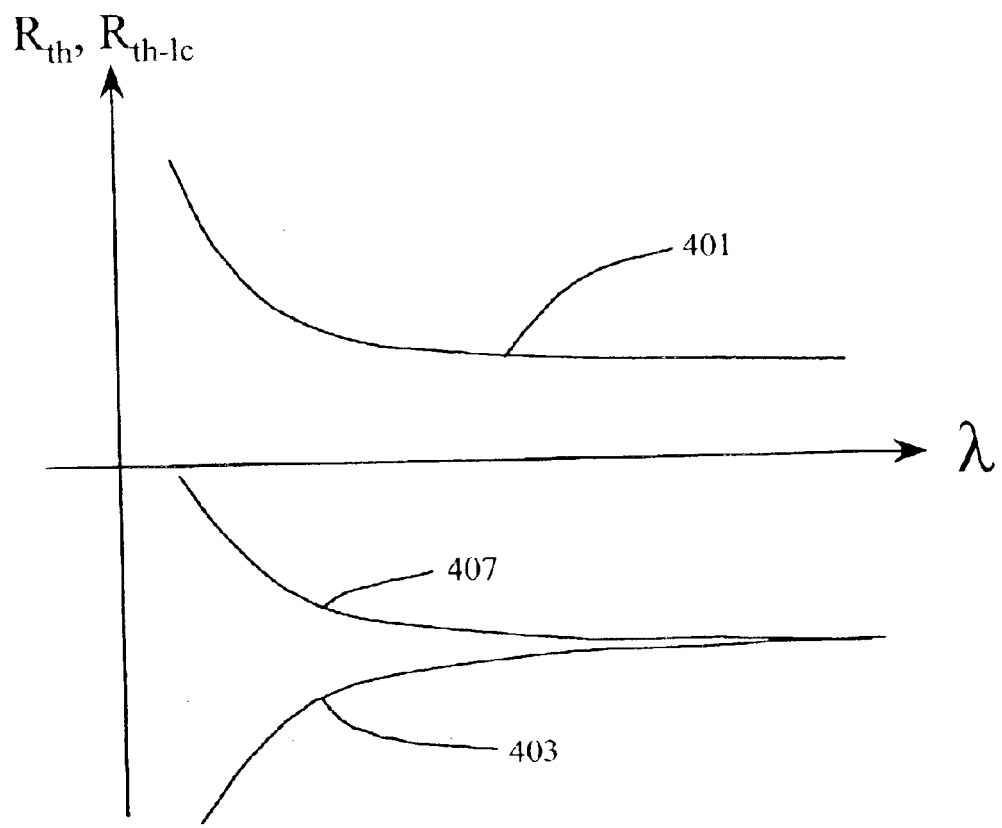
FIG. 3 shows a curve of proper dispersion of liquid crystals and curves for compensation films with proper and reverse dispersion.
Figure 4A:
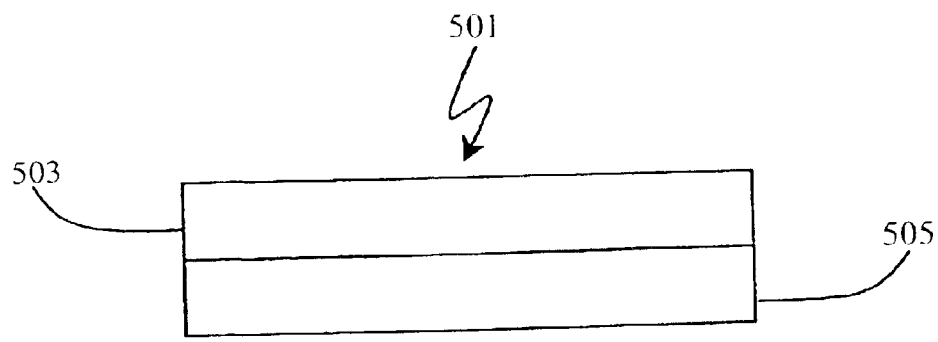
FIG. 4A, FIG. 4B and FIG. 4C are elevation schematics of the examples of compensation film.
Figure 4B:
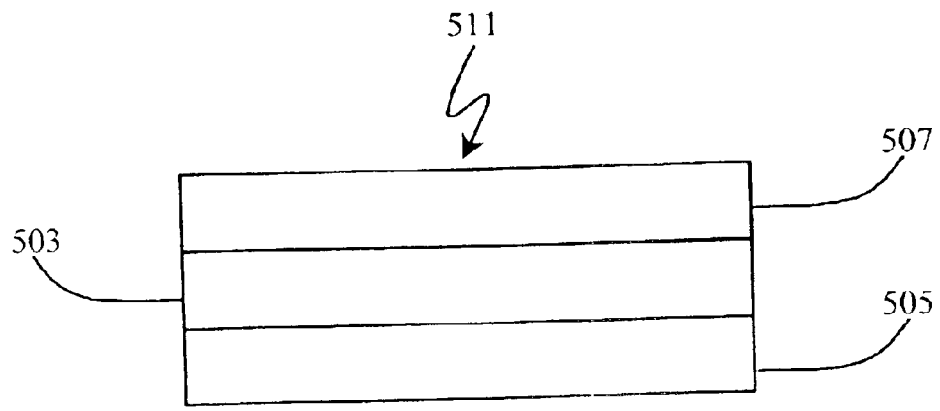
Figure 4C:
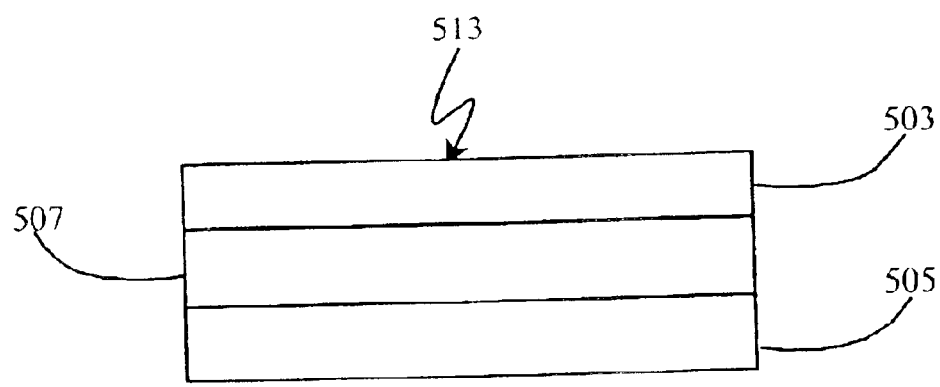

FIGS. 4A, 4B and 4C show the elevation views of exemplary structures of the compensation films. In compensation film 501, an amorphous polymer layer 503 is disposed on the substrate 505. The polymer layer 503 satisfies both conditions (1) and (2). FIG. 4B shows the compensation film 511 where an additional layer 507 is disposed on the polymer layer 503. The layer 507 can be, for example, an antiglare coating or anti-reflection coating. It can also be a hard-coat layer that mechanically protects the amorphous polymer layer 503. The order can change such that the layer 507 is disposed on the substrate followed by 503 such as the one 513 shown in FIG. 4C. In this case, 507 may have a function of buffer layer between the substrate 505 and the amorphous polymer layer 503. The buffer layer can promote the adhesion of the layer 503 to the substrate 505. In some other cases, it prevents the diffusion of chemical contamination from the substrate 505 to the polymer layer 503, thus acting as a barrier layer. Also, it may be a compliance layer to prevent the cracking of the polymer layer 503.

The substrate 505 can be optically isotropic or anisotropic. As is well known in the art, optical materials may have up to three different principal indices of refraction and can be classified as either isotropic or anisotropic based on the relationships of these indices. When all three of its principal indices are equal, a material is said to be isotropic. When anisotropic, a material can be either uniaxial, or biaxial. If two principal indices are equal, a material is called uniaxial. A uniaxial material is uniquely characterized, as having an ordinary index, referred as no, an extraordinary index ne and two angles describing the orientation of its optical axis, the axis of ne. When ne is greater than no, a uniaxial material is positively birefringent. When ne is smaller than no, a uniaxial material is negatively birefringent. Controlling birefringent behavior is particularly useful in the fabrication and application of optical films. When all three refractive indices are different, a material is said to be biaxial, uniquely specified by its principal indices nx, ny, nz, and three orientation angles. Some of biaxial materials show weak biaxiality meaning that two of their three principal indices are very close, which is often considered equally as the ordinary refractive index for a uniaxial material.

For an ease of the manufacturing, it is preferable to have a flexible substrate, particularly polymeric substrate. Typical polymeric substrate is triacetylcellulose (TAC). The optical property of TAC is close to the uniaxial and can be approximated as a negative C-plate, thus TAC has negligible $R_{in}$ and negative $R_{th}$. In other cases, biaxially stretched TAC is used for a substrate. In this case, the substrate has finite $R_{in}$ and $R_{th}$. TAC has reverse dispersion in out-of plane birefringence $\Delta n_{th}$. This reverse dispersion of TAC, however, is compensated by proper dispersion in $\Delta n_{th}$ of the amorphous polymer layer 503. Low birefringent polymeric material such as cyclic polyolefin can also be a substrate.

The amorphous polymer layer 503 is coated from a solution containing a polymer that yields large negative $\Delta n_{th}$ upon solvent coating. The large negative value of $\Delta n_{th}$ with proper dispersion will dominate the total negative $R_{th}$ of the compensation film and its kind of dispersion. Thus, by disposing a polymer layer 503 on top of a substrate (with negative $R_{th}$ and reverse dispersion), the overall negative $R_{th}$ will increase and the dispersion shape will become "proper". To produce an amorphous polymer layer with negative $\Delta n_{th}$ satisfying the condition (1) and (2), polymers that contain non-visible chromophore groups such as vinyl, carbonyl, amide, ester, carbonate, sulfone, azo, and aromatic groups (i.e. benzene, naphthalate, biphenyl, bisphenol A) in the polymer backbone will be used, such as polyesters, polycarbonates, polyetherimides, and polythiophenes. Preferably, polymers to be used in the layer 503 do not have chromophores off of the backbone. An example of such an undesirable polymer with chromophores in and off the backbone would be polyarylates possessing the fluorene group. The glass transition temperature (Tg) of the polymers used in the amorphous layer is a significant factor. It should be above 180° C. to achieve the desired results. The thickness of the amorphous polymer layer 503 is determined by the necessary value of $R_{th}$ that is at least more negative than −20 nm. Typically it should be from −600 nm to −60 nm. Conveniently it should be from −500 nm to −100 nm. Desirably it should be from −400 nm to −150 nm. The thickness of the polymer layer 503 should be less than 30 μm. Typically it should be from 0.1 μm to 20 μm. Conveniently it should be from 1.0 μm to 10 μm. Compensation films with structures other than shown in FIG. 4A, FIG. 4B and FIG. 4C are possible.

The overall thickness of the compensation film is important to keep overall LCD package thickness within the reasonable range. The combined thickness of the compensation film should be less than 115 μm. Typically it should be from 40 μm to 105 μm. Desirably it should be from 40 μm to 100 μm. The compensation film is optically transparent, namely, $T_{av} \geq 90\%$.

Figure 5A:
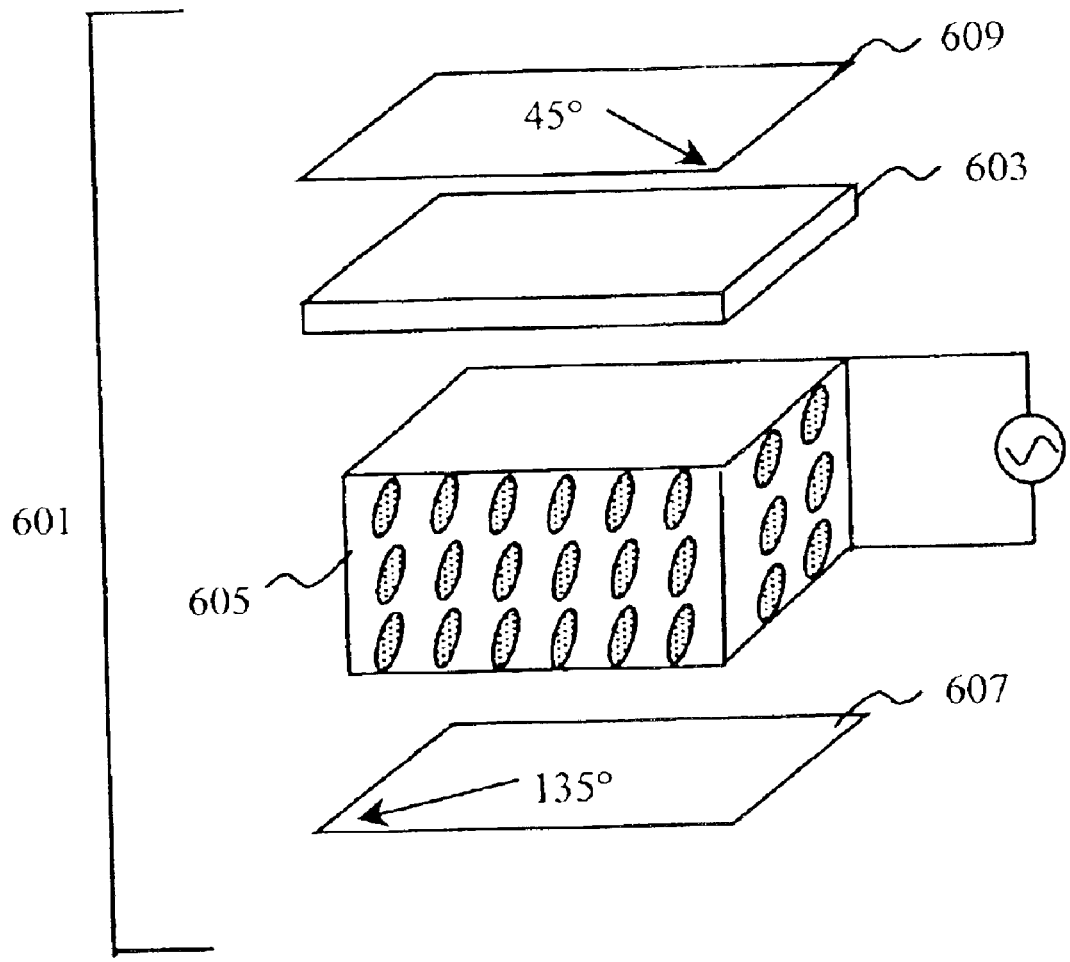
FIG. 5A and FIG. 5B show LCD's with one and two compensation film, respectively.

FIG. 5A shows a schematic liquid crystal display 601 where 603 is a single compensation film is placed on one side of the liquid crystal cell 605. 607 is a polarizer, and 609 is a second polarizer. The transmission axes for the polarizers 607 and 609 form 90°±10° angle relative to each other. The angles of their transmission axes are denoted as 45° and 135°. However, other angles are possible depending on the kind of liquid crystal display 601 and this is obvious to those who skilled in the art. Note that liquid crystal cell 605 is the electrically switchable liquid crystal cell with the liquid crystals confined between two glass plates.

Figure 5B:
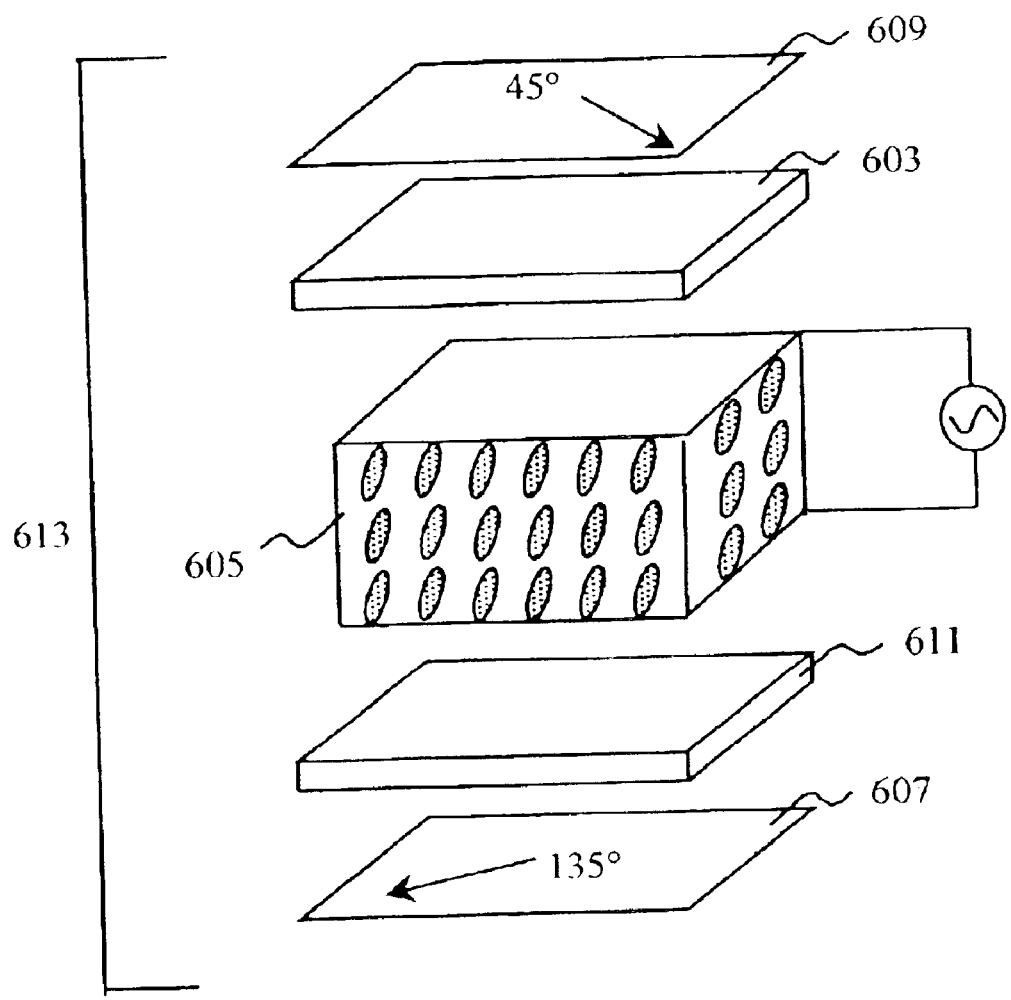
Figure 6:
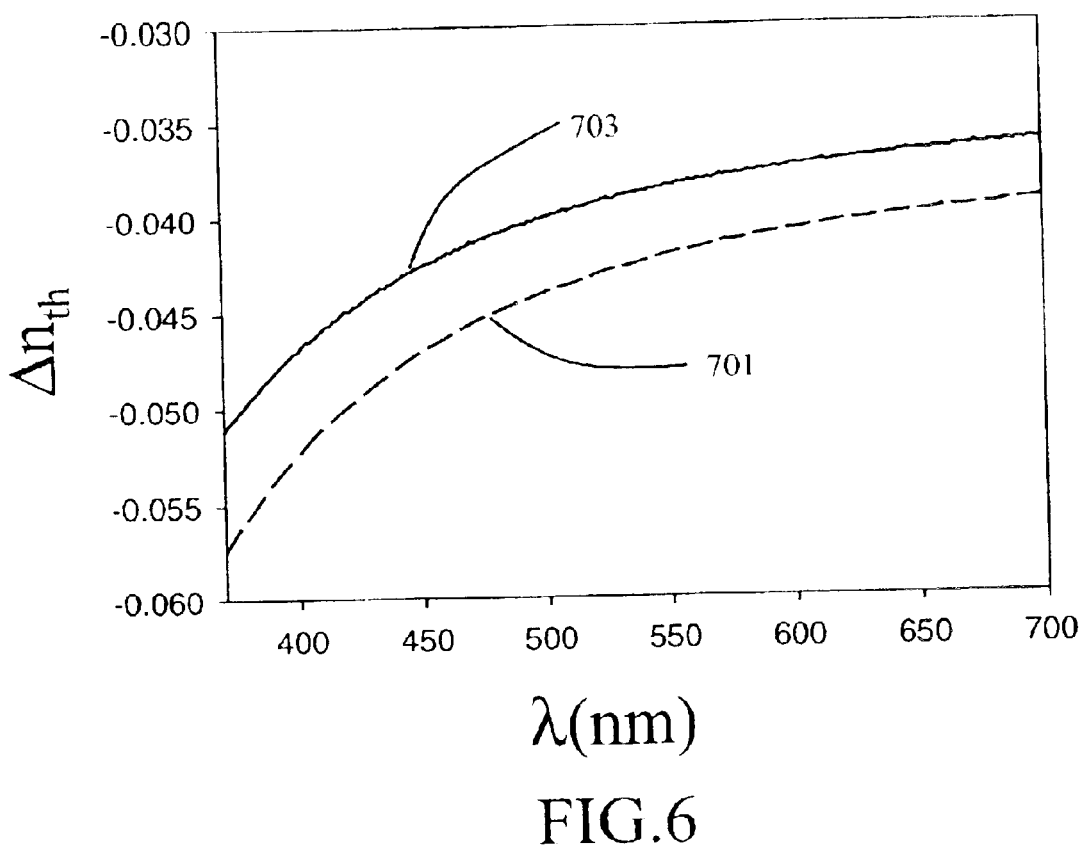
FIG. 6 shows proper dispersion in birefringence curves of an amorphous polymer layer.

FIG. 5B shows another schematic liquid crystal display 613 where there are two compensation films 603, 611 placed on both sides of the liquid crystal cell 605, 607 is a polarizer and 609 is a second polarizer. The transmission axes for the polarizers 607 and 609 form 90°±10° angle relative to each other. The angles of their transmission axes are denoted as 45° and 135°. However, other angles are possible depending on the kind of liquid crystal display 601 and this is obvious to those who skilled in the art. Note that 605 is the electrically switchable liquid crystal cell with the liquid crystals confined between two glass plates.

Compared to the prior art, embodiments of the present invention provide the compensation film with negative $R_{th}$ with proper dispersion that is optically transparent. Also, it provides a method of generating films with sufficiently large negative value of $R_{th}$ with a thickness that is much smaller than the conventional films such as TAC. This is possible because of the large negative value of $\Delta n_{th}$ of the amorphous polymer layer. Thus the invention enables enhanced optical compensation in a relatively thin (<115 μm) structure that can be easily manufactured.

The present invention is further illustrated by the following non-limiting examples of its practice.

EXAMPLES

The aromatic polyesters used herein can be prepared using any suitable or conventional procedure. The procedure used herein followed that outlined by P. W. Morgan in Condensation Polymers: By Interfacial and Solution Methods, Interscience, New York City, N.Y. (1965).

Example A
Polymer A (synthesis):

To a stirred mixture of 4,4'-hexafluoroisopropylidene-diphenol (23.53 g, 0.07 mole), 4,4'-(2-norbornylidene) bisphenol (8.4 g, 0.03 mole) and triethylamine (22.3 g, 0.22 mole) in methyl ethyl ketone (100 mL) at 10° C. was added a solution of terephthaloyl chloride (19.29 g, 0.095 mole) and isophthaloyl chloride (1.02 g, 0.005 mole) in methyl ethyl ketone (60 mL). After the addition, the temperature was allowed to rise to room temperature and the solution was stirred under nitrogen for 4 hours, during which time triethylamine hydrochloride precipitated in a gelatinous form and the solution became viscous. The solution was then diluted with toluene (160 mL) and washed with dilute hydrochloric acid, (200 mL of 2% acid) followed three times by water (200 mL). The solution was then poured into ethanol with vigorous stirring, and a white bead like polymer precipitated, collected and dried at 50° C. under vacuum for 24 hours. The glass transition temperature of this polymer was measured by differential scanning calorimetry to be 265° C.

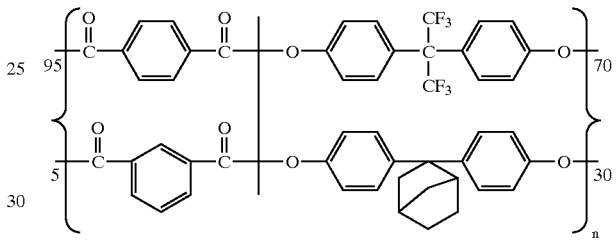

Poly(4,4'-hexafluoroisopropylidene-bisphenol-co-4,4'-(2-norbornylidene) bisphenol) terephthalate-co-isophthalate.

Polymer A

Polymer A was spun cast (8% solids in 80% propylacetate 20% toluene) onto a glass slide, and was analyzed with an ellipsometer (model M2000V, J.A. Woollam Co.) at 550 nm wavelength to obtain the $R_{th}$ and the thickness of the layer of polymer A. These values are listed in TABLE Ia.

TABLE Ia

| Polymer A Layer thickness (μm) | $R_{th}$, Out-of-Plane Retardation (nm) |
|---|---|
| 1.07 | −45 |

$R_{th}$ was similarly measured at other wavelengths and thus the $\Delta n_{th}$ was calculated by knowing retardation $R_{th}$ and layer thickness as shown in TABLE Ib.

TABLE Ib

| Wavelength (nm) | out-of-plane birefringence $\Delta n_{th}$ (unit dimension) |
|---|---|
| 370 | −0.057 |
| 550 | −0.042 |
| 700 | −0.039 |

Figure 7:
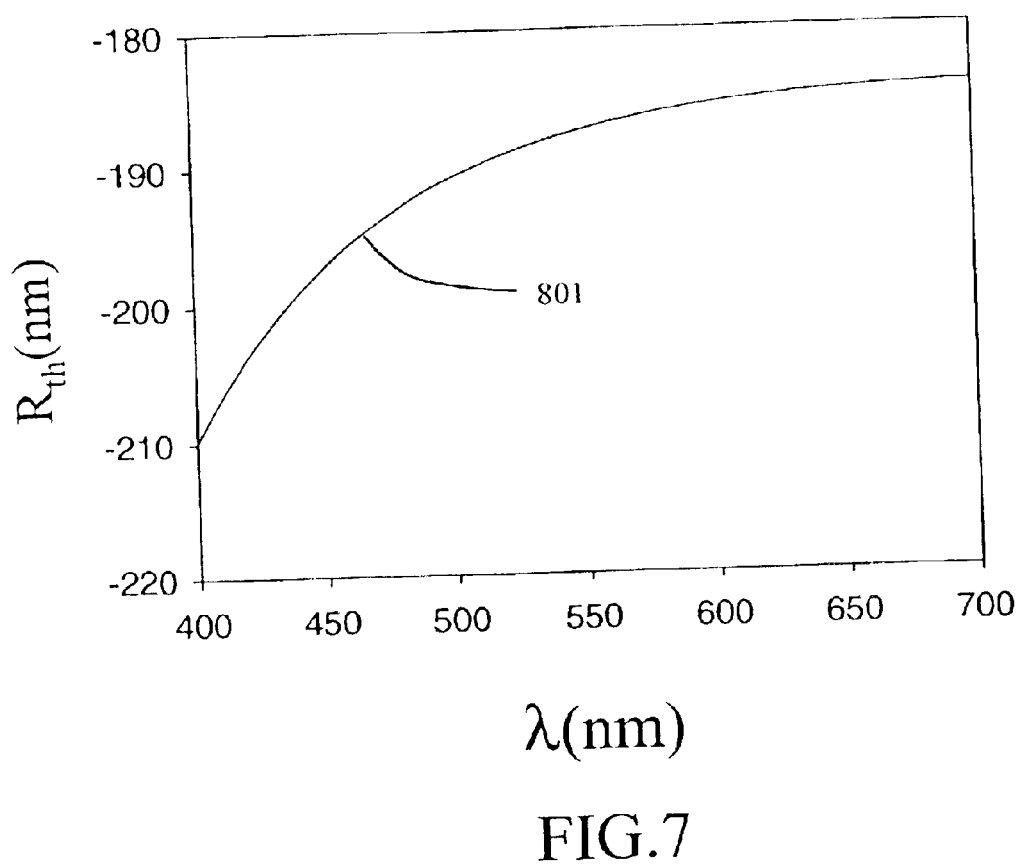
FIG. 7 shows the proper dispersion in phase retardation of an exemplary compensation film according to the invention.

The layer of polymer A also did not show any sign of a long-range order therefore the layer was determined to be comprised of an amorphous polymer. The dispersion curve 701 corresponding to $\Delta n_{th}$ of a polymer A layer is shown in FIG. 7. It shows larger negative value of $\Delta n_{th}$ at shorter wavelength λ. Thus, an amorphous polymer layer prepared according to the above mentioned method exhibits proper dispersion. $\Delta n_{th}$ is more negative than −0.005 at the wavelengths between 370 and 700 nm.

Additionally, a layer of polymer A is disposed on a triacetylcellulose (TAC) film (thickness 80 μm). The polymer A layer had a thickness of 3.6 μm as measured by ellipsometry. FIG. 7 shows the dispersion curve 801 of $R_{th}$ of the resulting compensation film. The compensation film shows proper dispersion. Transmission was measured for 400 nm≦λ≦700 nm and $T_{av}$≧90% was obtained.

Example B

Polymer B (synthesis):

To a stirred mixture of 4,4'-hexafluoroisopropylidene-diphenol (23.53 g, 0.07 mole), 4,4'-(2-norbornylidene) bisphenol (8.4 g, 0.03 mole) and triethylamine (22.3 g, 0.22 mole) in dichloromethane (100 mL) at 10° C. was added a solution of terephthaloyl chloride (19.29 g, 0.095 mole) in dichloromethane (60 mL). After the addition, the temperature was allowed to rise to room temperature and the solution was stirred under nitrogen for 4 hours, during which time triethylamine hydrochloride precipitated in a gelatinous form and the solution became viscous. The solution was then diluted with toluene (160 mL) and washed with dilute hydrochloric acid, (200 mL of 2% acid) followed three times by water (200 mL). The solution was then poured into ethanol with vigorous stirring, and a white bead like polymer precipitated, collected and dried at 50° C. under vacuum for 24 hours. The glass transition temperature of this polymer was measured by differential scanning calorimetry to be 274° C.

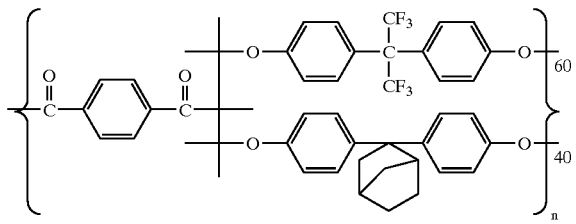

Poly(4,4'-hexafluoroisopropylidene-bisphenol-co-4,4'-(2-norbornylidene) bisphenol) terephthalate.

Polymer B

Polymer B was spun cast onto a glass slide (10% solids in 50% methyl ethyl ketone 50% toluene), and then was removed from this substrate. $R_{th}$ and the polymer layer thickness of the layer thus made were measured with an ellipsometer (model M2000V, J.A. Woollam Co.) at 550 nm wavelength. Results are shown in the TABLE IIa TABLE IIa

| Polymer B Layer thickness (μm) | $R_{th}$, Out-of-Plane Retardation (nm) |
| --- | --- |
| 4.02 | −154 |

Retardation was similarly measured at other wavelengths (show in TABLE IIb) and thus the $\Delta n_{th}$ was calculated by knowing retardation and layer thickness.

TABLE IIb

| Wavelength (nm) | out-of-plane birefringence $\Delta n_{th}$ (unit dimension) |
| --- | --- |
| 370 | −0.051 |
| 550 | −0.038 |
| 700 | −0.036 |

The layer of polymer B did not show any sign of a long-range order. Therefore the layer was determined to be comprised of an amorphous polymer. The dispersion curve 703 of $\Delta n_{th}$ of polymer B is shown in FIG. 7. It shows larger negative value of $\Delta n_{th}$ at shorter wavelength λ. Thus, an amorphous polymer layer prepared according to the above mentioned method exhibits proper dispersion. $\Delta n_{th}$ is more negative than −0.005 at the wavelengths between 370 and 700 nm.

Other specific polymers that could be used include:

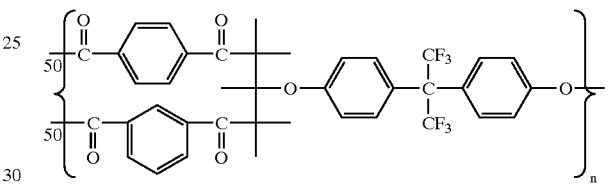

Poly(4,4'-hexafluoroisopropylidene-bisphenol) terephthalate-co-isophthalate

Polymer C

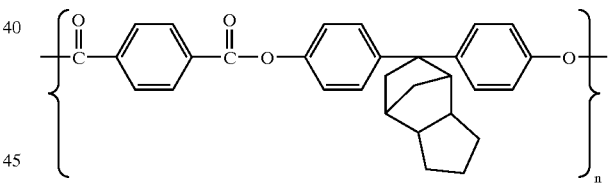

Poly(4,4'-hexahydro-4,7-methanoindan-5-ylidene bisphenol)terephthalate

Polymer D

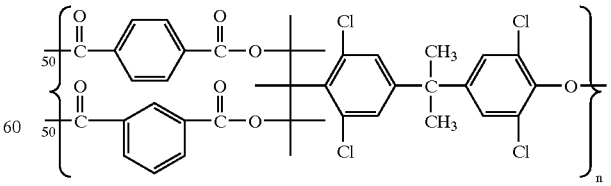

Poly(4,4'-isopropylidene-2,2'6,6'-tetrachlorobisphenol) terephthalate-co-isophthalate Polymer E

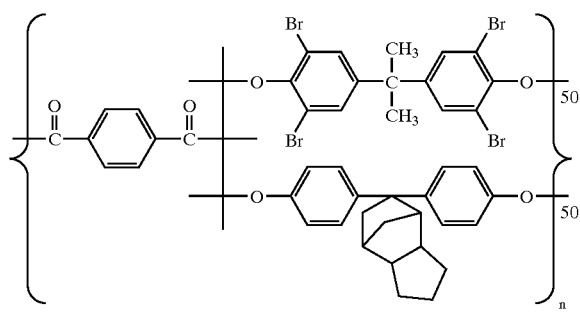

Poly(4,4'-hexahydro 4,7-methanoindan-5-ylidene)-
bisphenol-co-(4,4'-isopropylidene-2,2',6,6'-
tetrabromo)-bisphenol terephthalate Polymer F

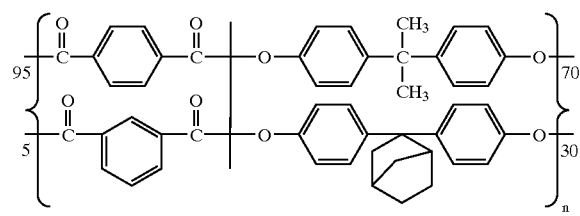

Poly(4,4'-isopropylidene-bisphenol-co-4,4'-(2-
norbornylidene) bisphenol) terephthalate-co-isophthalate Polymer G A series of polymers were analyzed for their glass transition temperatures and out of plane birefringence values $\Delta n_{th}$. It was found that the more desirable polymers for this invention had glass transition temperatures above 180° C. Those with lower glass transition temperatures were found to, generally, have out-of-plane birefringence $\Delta n_{th}$ values less negative than −0.005.

Comparative Example:

Rth of a cellulose ester film (thickness: 110 μm as measured by a micrometer) was measured with an ellipsometer (model M2000V, J.A. Woollam Co.) at wavelengths between 400 to 700 nm. Values of $R_{th}$ at three wavelengths are listed in the Table III.

TABLE III

| Wavelength (nm) | out-of-plane retardation $R_{th}$ (nm) |
| --- | --- |
| 400 | −244 |
| 550 | −257 |
| 700 | −266 |

Figure 8:
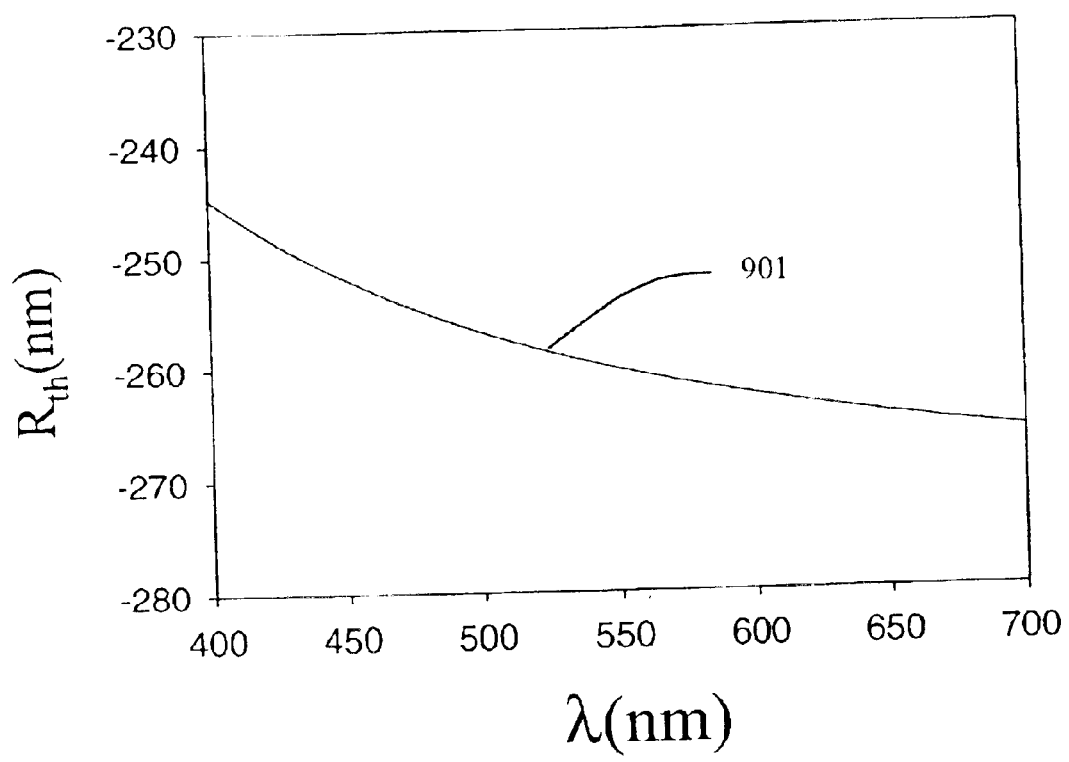
FIG. 8 shows the reverse dispersion in phase retardation curve of comparative example.

The dispersion curve 901 of $R_{th}$ of the comparative example film is shown in FIG. 8. It shows smaller negative value of $R_{th}$ at shorter wavelength λ, thus the comparative example film exhibits reverse dispersion. From the measured thickness and $R_{th}$, $\Delta n_{th}$ was calculated. $\Delta n_{th}$ is less negative than −0.005 at the wavelength between 370 and 700 nm. Note that this film does not show enough negative birefringence and does not have the desired dispersion sign.

The invention has been described in detail with particular reference to certain preferred embodiments thereof, but it will be understood that variations and modifications can be effected within the scope of the invention. The entire contents of the patents and other publications referred to in this specification are incorporated herein by reference.

PARTS LIST

201 compensation film
203 plane of the film
301 index ellipsoid approximating the state of liquid crystal cell 305
305 Liquid Crystal cell
307 compensation film
309 index ellipsoid representing the compensation film 307
311 obliquely propagating rays
401 dispersion curve of typical liquid crystal
403 dispersion curve for compensation film with proper dispersion
407 dispersion curve for compensation film with reverse dispersion
501 compensation film
503 polymer layer
505 substrate
507 additional layer
511 compensation film
513 compensation film
601 liquid crystal display
603 compensation film
605 liquid crystal cell
607 polarizer
609 polarizer
611 compensation film
613 liquid crystal display
701 dispersion curve (birefringence) of the example polymer layer A
703 dispersion curve (birefringence) of the example polymer layer B
801 dispersion curve (phase retardation) of the exemplary compensation film
901 dispersion curve (phase retardation) of the comparative example film
φ angle of incidence of ray
nx index of refraction in x direction
ny index of refraction in y direction
nz index of refraction in z direction
$nx_{lc}$ index of refraction in x direction of liquid crystal cell
$ny_{lc}$ index of refraction in y direction of liquid crystal cell
$nz_{lc}$ index of refraction in z direction of liquid crystal cell
no ordinary index of refraction
ne extraordinary index of refraction
$no_{lc}$ ordinary index of refraction of liquid crystal
$ne_{lc}$ ordinary index of refraction of liquid crystal
$\Delta n_{lc}$ birefringence of liquid crystal
$\Delta n_{th}$ out-of-plane birefringence
d thickness of the film
$d_{lc}$ thickness of the liquid crystal cell
$R_{in}$ in-plane phase retardation
$R_{th}$ out-of-plane phase retardation
$R_{th\text{-}lc}$ out-of-plane phase retardation of the liquid crystal cell
λ wavelength

What is claimed is:

1. An optically transparent compensation film for Liquid Crystal Displays comprising an amorphous polymer layer disposed on a substrate wherein said amorphous polymer layer comprises a polymer with a glass transition temperature Tg above 180° C. and has an out-of-plane birefringence $\Delta n_{th}(\lambda)$ at a wavelength λ that satisfies both conditions (1) and (2):

Condition (1)

$\Delta n_{th}(\lambda)$ is more negative than −0.005 throughout the range of 370 nm<$\lambda$<700 nm;

Condition (2)

$\Delta n_{th}(\lambda_1)$ is more negative than $\Delta n_{th}(\lambda_2)$, for $\lambda_1<\lambda_2$ throughout the range of 370 nm<$\lambda$<700 nm.

2. An optically transparent compensation film according to claim 1 wherein, the out-of-plane phase retardation, $R_{th}$, of said compensation film satisfies condition (3):

Condition (3)

$R_{th}$ at $\lambda_1$ is more negative than $R_{th}$ at $\lambda_2$, for $\lambda_1<\lambda_2$ throughout the range of 400 nm<$\lambda$<700 nm.

3. An optically transparent compensation film according to claim 2 wherein, said amorphous polymer layer is contiguous to the substrate.

4. An optically transparent compensation film according to claim 2 wherein, said amorphous polymer layer is contiguous to a barrier layer, which is contiguous to the substrate.

5. An optically transparent compensation film according to claim 2 wherein, said substrate is optically uniaxial.

6. An optically transparent compensation film according to claim 5 wherein, said uniaxial substrate is negative-C plate and the $R_{th}$(at $\lambda$=550 nm wavelength) is between −20 to −250 nm.

7. An optically transparent compensation film according to claim 2 wherein, said substrate is optically biaxial.

8. An optically transparent compensation film according to claim 2 wherein, an additional layer is disposed on said amorphous polymer layer.

9. An optically transparent compensation film according to claim 8 wherein, said additional layer has an anti-reflection function.

10. An optically transparent compensation film according to claim 8 wherein, said additional layer has an anti-glare function.

11. An optically transparent compensation film according to claim 8 wherein, said additional layer is a hard-coat layer.

12. An optically transparent compensation film according to claim 2 wherein, said substrate is optically isotropic.

13. An optically transparent compensation film according to claim 2 wherein, said amorphous polymer layer has a thickness of from 0.1 to 30 $\mu$m.

14. An optically transparent compensation film according to claim 13 wherein, said amorphous polymer layer has a thickness of from 1 to 10 $\mu$m.

15. An optically transparent compensation film according to claim 2 wherein, said amorphous polymer layer comprises a polymer containing in the backbone a non-visible chromophore group.

16. An optically transparent compensation film according to claim 15 wherein, said non-visible chromophore group includes a carbonyl, amide, ester, carbonate, phenyl, naphthyl, biphenyl, bisphenol, or thiophene group.

17. An optically transparent compensation film of claim 15 wherein, said amorphous polymer layer comprises a polymer containing in the backbone a non-visible chromophore group that does not contain a chromophore off of the backbone.

18. An optically transparent compensation film according to claim 17 wherein, said amorphous polymer layer comprises a polymer containing in the backbone a vinyl, carbonyl, amide, ester, carbonate, aromatic, sulfone, or azo group.

19. An optically transparent compensation film according to claim 2 wherein, said amorphous polymer layer comprises 1)poly(4,4'-hexafluoroisopropylidene-bisphenol) terephthalate-co-isophthalate, 2)poly(4,4'-hexahydro-4,7-methanoindan-5-ylidene bisphenol) terephthalate, 3) poly(4,4'-isopropylidene-2,2'6,6'-tetrachlorobisphenol) terephthalate-co-isophthalate, 4) poly(4,4'-hexafluoroisopropylidene)-bisphenol-co-(2-norbornylidene)-bisphenol terephthalate, 5) poly(4,4'-hexahydro-4,7-methanoindan-5-ylidene)-bisphenol-co-(4,4'-isopropylidene-2,2',6,6'-tetrabromo)-bisphenol terephthalate, or 6) poly(4,4'-isopropylidene-bisphenol-co-4,4'-(2-norbornylidene) bisphenol) terephthalate-co-isophthalate or copolymers of any of the foregoing.

20. An optically transparent compensation film according to claim 2 wherein, said amorphous polymer layer comprises poly(4,4'-hexafluoroisopropylidene-bisphenol-co-4,4'-(2-norbornylidene) bisphenol) terephthalate-co-isophthalate or copolymers thereof.

21. An optically transparent compensation film according to claim 2 wherein, said substrate comprises triacetylcellulose (TAC), polycarbonate, cyclic polyolefin or polyarylate containing fluorene groups.

22. An optically transparent compensation film according to claim 2 wherein, more than one layer of said amorphous polymer are disposed on said substrate.

23. An optically transparent compensation film according to claim 2 wherein, the thickness of said compensation film is less than 115 $\mu$m.

24. An optically transparent compensation film according to claim 24 wherein, the thickness of said compensation film is between 40 to 100 $\mu$m.

25. A liquid crystal display comprising a liquid crystal cell, a pair of crossed polarizers located one on each side of the cell, and at least one optical compensation film according to claim 2.

26. A liquid crystal display according to claim 25 wherein, said liquid crystal cell is a Vertically Aligned liquid crystal cell or Twisted Nematic liquid crystal cell.

27. A process for forming an optically transparent compensation film for an liquid crystal displays comprising coating an layer of amorphous polymer in a solvent onto a substrate wherein, said amorphous polymer layer satisfies the both conditions (1) and (2):

Condition (1)

$\Delta n_{th}(\lambda)$ is more negative than −0.005 throughout the range of 370 nm<$\lambda$<700 nm;

Condition (2)

$\Delta n_{th}(\lambda_1)$ is more negative than $\Delta n_{th}(\lambda_2)$, for $\lambda_1<\lambda_2$ throughout the range of 370 nm<$\lambda$<700 nm, and said amorphous polymer layer comprises selected polymeric materials and said layer has sufficient thickness so that the out-of-plane retardation $R_{th}$(at $\lambda$=550 nm wavelength) of said amorphous polymer layers is more negative than −5 nm.

28. An optical compensation film for Liquid Crystal Displays comprising an amorphous polymer layer disposed on a polymeric substrate wherein said amorphous polymer layer comprises a polymer with a Tg above 180° C. and has an out-of-plan birefringence $\Delta n_{th}(\lambda)$ at a wavelength $\lambda$ that satisfies both conditions (1) and (2):

Condition (1)

$\Delta n_{th}(\lambda)$ is more negative than −0.005 throughout the range of 370 nm<$\lambda$<700 nm;

Condition (2)

$\Delta n_{th}(\lambda_1)$ is more negative than $\Delta n_{th}(\lambda_2)$, for $\lambda_1<\lambda_2$ throughout the range of 370 nm<$\lambda$<700 nm.

29. An optical compensation film according to claim 28 wherein, said polymeric substrate comprises triacetylcellulose (TAC), polycarbonate, cyclic polyolefin or polyarylate containing fluorene groups.

30. An optical compensation film according to claim 28 wherein, said amorphous polymer layer comprises 1)poly(4,4'- hexafluoroisopropylidene-bisphenol) terephthalate-co-isophthalate, 2)poly(4,4'- hexahydro-4,7-methanoindan-5-ylidene bisphenol) terephthalate, 3) poly(4,4'-isopropylidene-2,2'6,6'-tetrachlorobisphenol) terephthalate-co-isophthalate, 4) poly(4,4'-hexafluoroisopropylidene) bisphenol-co-(2-norbornylidene)-bisphenol terephthalate, 5) poly(4,4'-hexahydro-4,7-methanoindan-5-ylidene)-bisphenol-co- (4,4'-isopropylidene-2,2',6,6'-tetrabromo)-bisphenol terephthalate, or 6) poly(4,4'-isopropylidene-bisphenol-co-4,4'-(2-norbornylidene) bisphenol) terephthalate-co-isophthalate or copolymers of any of the foregoing.

31. An optical compensation film according to claim 28 wherein, said amorphous polymer layer comprises poly(4,4'-hexafluoroisopropylidene-bisphenol-co-4,4'-(2-norbornylidene) bisphenol) terephthalate-co-isophthalate or copolymers thereof.

32. An optical compensation film according to claim 28 wherein, said amorphous polymer layer comprises a polymer containing in the backbone a nopn-visible chromophore group.

33. A liquid crystal display comprising a liquid crystal cell, a pair of crossed polarizers located one on each side of the cell, and a least one optical compensation film according to claim 28.

34. A liquid crystal display according to claim 33 wherein, said liquid crystal cell is a Vertically Aligned liquid crystal cell or Twisted Nematic liquid crystal cell.

* * * * *